(12) United States Patent
Riviezzo

(10) Patent No.: US 7,422,027 B2
(45) Date of Patent: *Sep. 9, 2008

(54) MARINE FUEL TANK VENT VALVE

(76) Inventor: Tony Riviezzo, 1656 Stone Creek La., Twinsburg, OH (US) 44087

( * ) Notice: Subject to any disclaimer, the term of this patent is extended or adjusted under 35 U.S.C. 154(b) by 0 days.

This patent is subject to a terminal disclaimer.

(21) Appl. No.: 11/733,293

(22) Filed: Apr. 10, 2007

(65) Prior Publication Data

US 2007/0215623 A1 Sep. 20, 2007

(51) Int. Cl.
F16K 24/04 (2006.01)

(52) U.S. Cl. .................. 137/202; 137/43; 137/589; 141/216

(58) Field of Classification Search ............ 137/202, 137/589, 899.2, 449, 519.5, 505.19, 247.71, 137/247.43; 141/59, 214–216; 220/203.2
See application file for complete search history.

(56) References Cited

U.S. PATENT DOCUMENTS

| | | | |
|---|---|---|---|
| 1,252,267 A | 1/1918 | Hoffman | |
| 1,603,240 A | 10/1926 | Gregory | |
| 1,648,047 A | 11/1927 | Giesler | |
| 2,313,773 A | 3/1943 | Samiran | |
| 2,510,098 A | 6/1950 | Geisler | |
| 2,909,186 A | 10/1959 | Larson | |
| 3,603,359 A | 9/1971 | Belue | |
| 3,830,252 A | 8/1974 | Follett | |
| 3,958,591 A | 5/1976 | Hansel | |
| 3,970,098 A * | 7/1976 | Boswank et al. | 137/39 |
| 4,325,398 A * | 4/1982 | Green | 137/39 |
| 4,457,325 A * | 7/1984 | Green | 137/39 |
| 4,487,215 A * | 12/1984 | Green | 137/43 |
| 4,586,528 A | 5/1986 | Andres | |
| 4,796,777 A * | 1/1989 | Keller | 220/203.2 |
| 4,854,469 A | 8/1989 | Hargest | |
| 5,129,422 A | 7/1992 | Davison, Jr. | |
| 5,273,466 A | 12/1993 | Thompson | |
| 5,386,843 A | 2/1995 | Church | |
| 5,435,335 A | 7/1995 | Klop | |
| 5,687,756 A | 11/1997 | VanNatta | |
| 5,762,093 A | 6/1998 | Whitley, II | |
| 5,899,227 A | 5/1999 | Stuart | |
| 6,029,697 A | 2/2000 | Phillips | |

(Continued)

Primary Examiner—John Rivell
Assistant Examiner—Craig Price
(74) Attorney, Agent, or Firm—William H. Honaker; Dickinson Wright PLLC

(57) ABSTRACT

The present invention relates to a simple fuel vent assembly for use in inboard and outboard fuel tanks for marine vessels. The vent assembly includes upper and lower portions defining an L shaped interior passageway. The lower portion includes upper and lower valve seats positioned within this passageway. Spaced vent openings extend through the lower portion above and below the valve seat. A spherical float is positioned within the passageway between the upper and lower valve seats. As fuel is added to the tank, pressure can escape through the fuel vent. The flow valve is within the passageway as the level of liquid fuel in the tank rises during the fuel refilling process. When the tank is at its desired fill level the float engages the upper valve seat and forms a seal preventing liquid fuel from traveling past the upper seat and through the passageway into the atmosphere outside the tank. The second vent opening remained open to vent pressure from the space between the top of the tank and the fuel level.

9 Claims, 5 Drawing Sheets

U.S. PATENT DOCUMENTS

| | | |
|---|---|---|
| 6,138,707 A | 10/2000 | Stuart |
| 6,158,456 A | 12/2000 | Enge |
| 6,347,640 B1 | 2/2002 | Meyer |
| 6,443,177 B2 | 9/2002 | Romanek |
| 7,017,599 B2 * | 3/2006 | Keefer et al. ............... 137/72 |
| 7,225,826 B2 * | 6/2007 | Riviezzo .................. 137/202 |

* cited by examiner

MARINE FUEL TANK VENT VALVE

FIELD OF THE INVENTION

The present invention relates generally to refueling valves and more particularly to refueling valves having pressure vents and fluid stops for use with fuel tanks used in the marine industry.

BACKGROUND OF THE INVENTION

Devices for venting fuel tanks in vehicles and, in particular, marine vessels, are well known in the art. Typical marine fuel venting devices facilitate the process of filling a tank with liquid fuel by compensating for changes in pressure within the tank as the volume of fuel dispensed into the tank increases and the fuel transitions between liquid and gas phases. Such devices typically consist of vent lines installed in the tanks. One end of the vent line is formed into the top of the tank and the other end opens into the atmosphere exterior to the tank.

Although a vent line helps prevent the buildup of fuel pressure within the tank, the vent line does not prevent the unintentional overboard venting of liquid fuel through the vent line, which frequently occurs when a marine fuel tank is being refueled. This unintentional venting occurs when the tank is overfilled or becomes full and resultant displaced vapors carry liquid fuel through the vent line to be discharged into the water or onto land.

SUMMARY OF THE INVENTION

The subject invention provides a simple fuel vent assembly for use in the inboard or outboard fuel tank of a marine vessel. The vent assembly includes upper and lower portions defining an L-shaped interior passageway therethrough. The lower portion includes upper and lower valve seats positioned within the passageway. Spaced vent openings extend through the lower portion above and below the upper valve seat. A spherical float is disposed within the passageway between the upper and lower valve seats. As fuel is added to the tank, pressure can escape through the fuel vent. The float rises within the passageway as the level of liquid fuel in the tank rises during the refueling process. When the tank is at its desired fill level the float engages the upper valve seat and forms a seal preventing liquid fuel from traveling past the upper seat and through the passageway into the atmosphere outside the tank. The second vent opening remains open to vent pressure from the space between the top of the tank and the fuel level.

It should be understood that although the present invention is disclosed in a typical marine type application and with reference to a plastic fuel tank, it should be understood that the container of the present invention can be fabricated with materials other than plastic.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
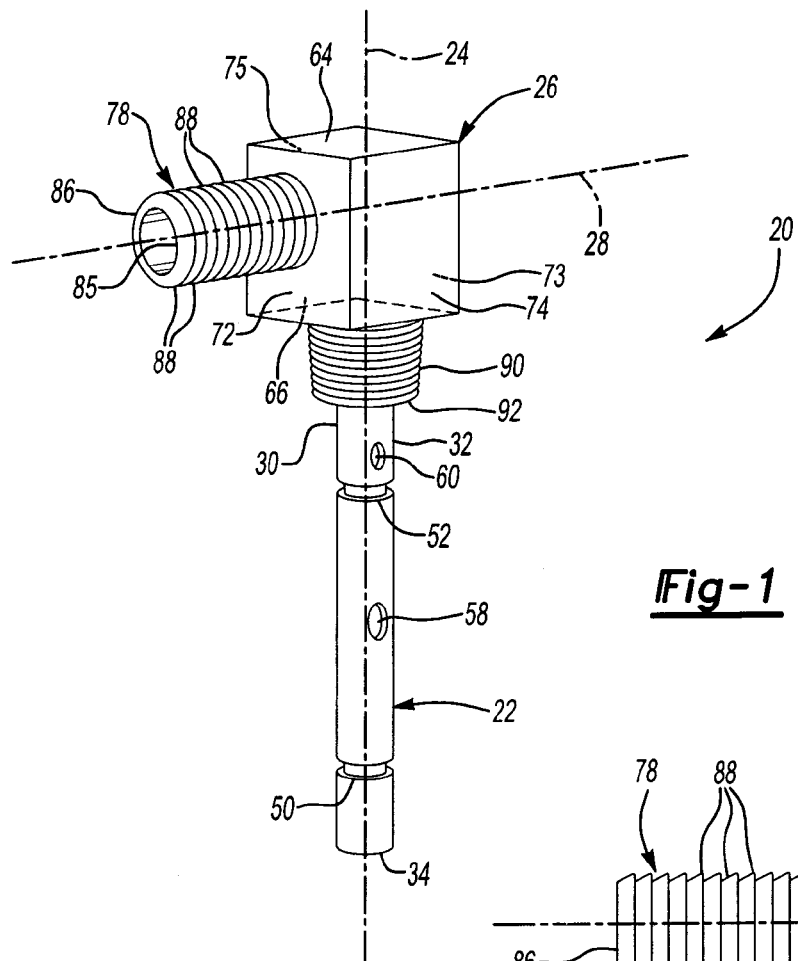
FIG. 1 is a perspective view of a fuel vent assembly according to an embodiment of the invention.
Figure 2:
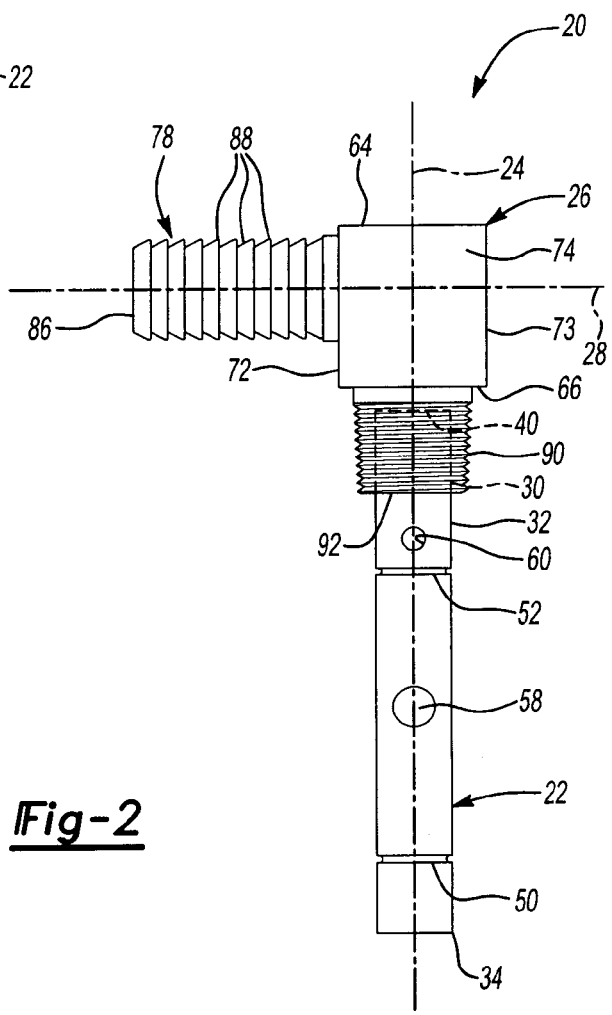
FIG. 2 is a side view of the vent assembly.
Figure 3:
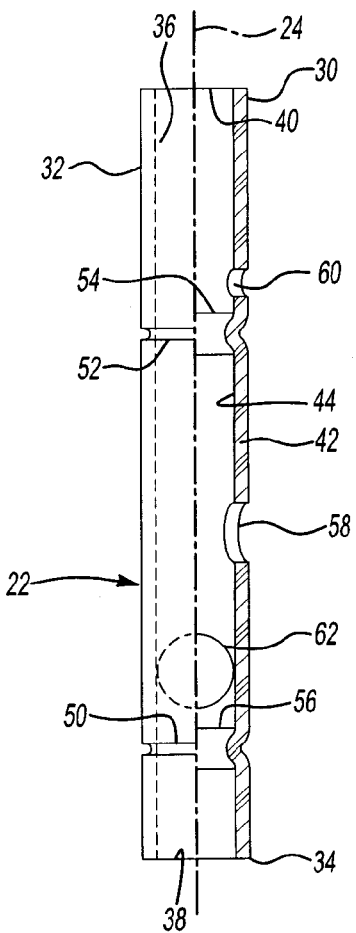
FIG. 3 is a partial cross-sectional side view of the lower portion of the vent assembly.
Figure 4:
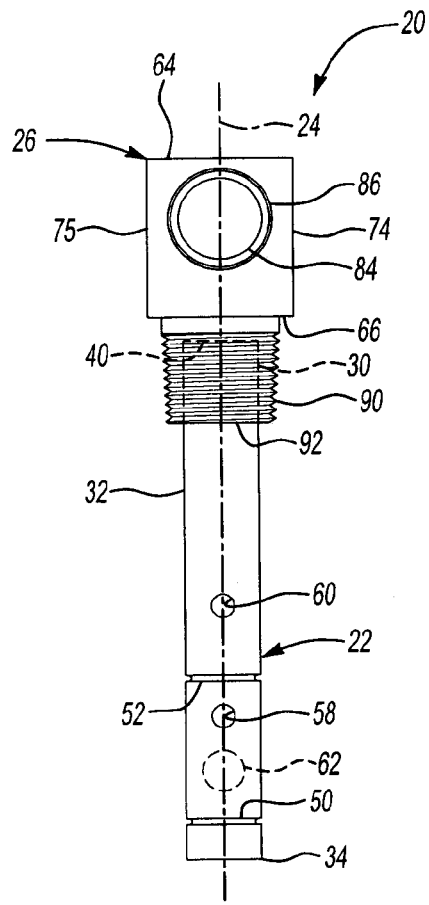
FIG. 4 is a front view of the vent assembly.
Figure 5:
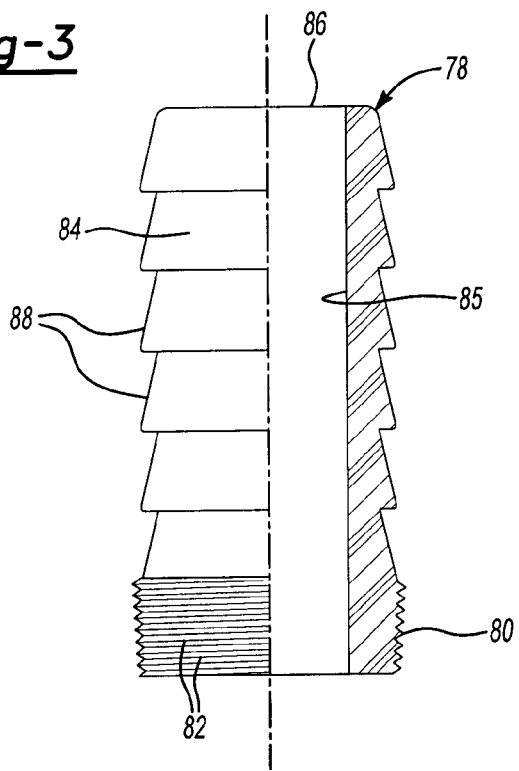
FIG. 5 is a side view of the barbed fitting of the vent assembly.
Figure 6:
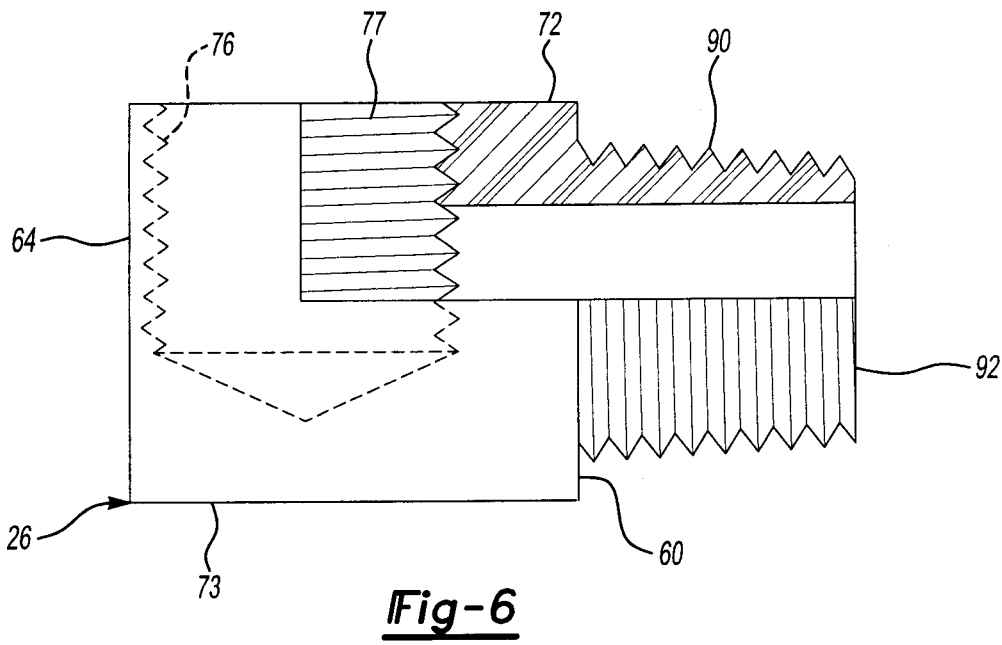
FIG. 6 is a partial cross-sectional side view of the upper portion of the vent assembly with the barbed fitting removed.

Referring to the Figures, wherein like numerals indicate like or corresponding parts throughout the several views, a fuel vent valve assembly is generally shown at 20. The assembly 20 includes a lower portion 22 having a longitudinal axis 24 and an upper portion 26 with a longitudinal axis 28. The upper portion 26 and lower portion 22 define a flow path which allows pressure to enter the lower portion 22 and exit the upper portion 26. The lower portion 22 has a proximal end 30 from which a cylindrical sidewall 32 coaxially extends along the longitudinal axis 24 to a distal end 34. The cylindrical sidewall 32 defines an interior passage 36 which is part of the flow path, extending through the lower portion 22, and the proximal and distal ends 30 and 34 define respective intake and discharge ports 38 and 40 that fluidly communicate with the interior passage 36.

Figure 7:
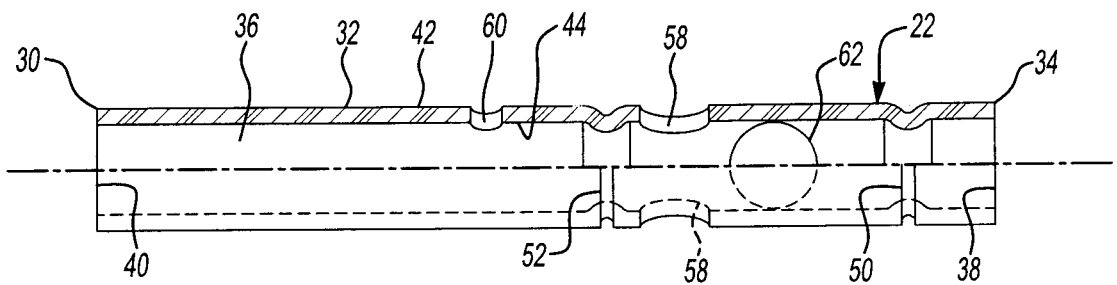
FIG. 7 is a partial cross-sectional side view of the lower portion of a vent assembly according to an alternative embodiment of the invention.

The cylindrical sidewall 32 has exterior and interior surfaces 42 and 44, respectively. Spaced annular indentations are formed in the sidewall 32 and define annular grooves 50, 52 in the exterior surface 42. The grooves 50, 52 are axially spaced and extend perpendicular to the longitudinal axis 24. The indentations also define an upper valve seat 54 and a lower valve seat 56 within the interior passage 36. Each seat 54 and 56 is an annular ridge that extends radially from the interior surface 44 into the passage 36. The sidewall 32 includes a first vent opening 58 located between the upper and lower valve seats 54 and 56. In the preferred embodiment there are two openings on opposite sides of the lower portion, each of these is approximately 3/16 inches in diameter. A second vent opening 60 is located between the upper valve seat 54 and distal end 34. The second vent opening is approximately 1/8 inch in diameter. As is shown in FIG. 7, the lower portion 22 may alternatively include a pair of spaced first vent openings 58.

A spherical float 62, which in the preferred embodiment is approximately 5/16 inch in diameter, is captured within the interior passage 36 between the upper and lower valve seats 54 and 56. The float 62 may be fabricated from any suitable material having a density less than the density of the liquid fuel disposed within the fuel tank and greater than the density of pressure above the surface of the liquid fuel. This permits the float 62 to be carried by, or float on, the surface of the liquid fuel for movement between the seats 54 and 56 within the interior passage 36. In the preferred embodiment, the seats 54 and 56 have chamfered surfaces complementary to the spherical surface of the float 62 that sealingly engage the float 62 to selectively prevent liquid fuel from flowing through selected portions of the interior passage 36 and vent openings 58 and 60.

The upper portion 26 includes top and bottom surfaces 64 and 66 between which a first pair of opposed sidewalls 72, 73 and a second pair of opposed sidewalls 74, 75 extend. A female fitting 76 having tapered threads 77 extends inwardly from the sidewall 72 and perpendicularly to the longitudinal axis of the interior passage 36. A barbed fitting 78 having a male end 80 with tapered threads 82 complementary to the tapered threads 77 is coupled with the female fitting 76. The barbed fitting 78 includes a cylindrical portion 84 with a bore 85 therethrough. The cylindrical portion 84 extends from the male end 80 to a distal end 86 for being inserted within the bore of a hose. A plurality of radially extending barbs 88 are disposed about the cylindrical portion 84 for engaging the interior of the hose to form a redundant seal between the hose and the fitting 78.

The upper portion 26 also includes a mounting connection or threaded male fitting 90 extending from the bottom surface 66 to a connecting end 92. The fitting 90 has a cylindrical inner wall 94 defining a passage 96, which is part of the flow path that extends from the connecting end 92 to the bore 85. The inner wall 94 is complementary to the exterior sidewall 32 adjacent the proximal end 30, which in turn allows the proximal end 30 to be disposed within the passage 96 against the inner wall 94 to thereby interconnect the interior passage 36, passage 96 and bore 85 to form an L-shaped fluid pathway extending through the lower and upper portions 22 and 26.

Figure 8:
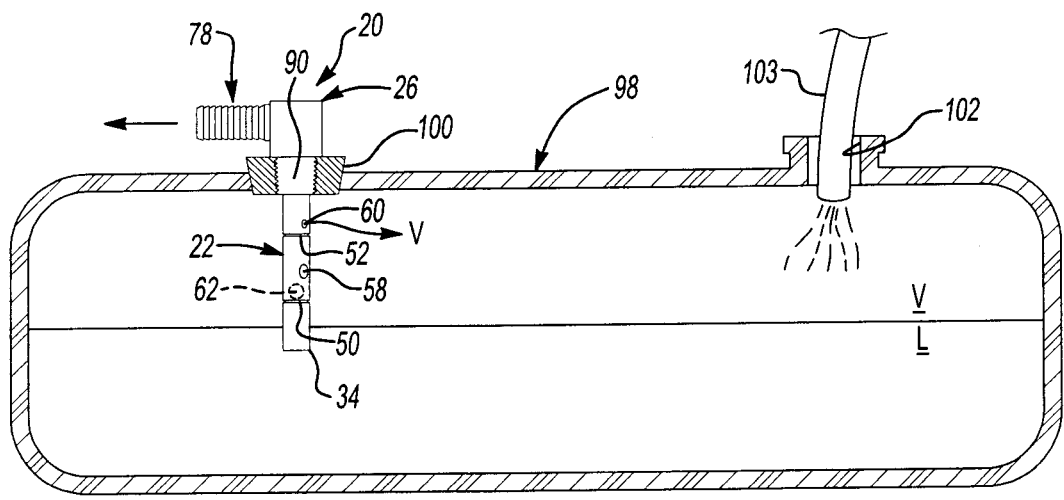
FIG. 8 is a side view of the vent assembly in use with a fuel tank.

Referring now to FIGS. 8 through 11, the assembly 20 is shown in use with a fuel tank 98. In particular, the male fitting 90 is threadably coupled to a complementary female fitting 100 formed in the sidewall of the tank 98. The tank 98 includes an opening 102 through which fluid is dispensed through a fuel nozzle 103 into the interior of the tank 98. In the marine industry, regulations require that pressure in the fuel tank be vented. As fuel is added to the tank 98, pressure will increase within the tank 98, unless vented. Openings 58 and 60 allow pressure within the tank 98 to vent out through bore 85. As is shown in FIG. 8, when the level of liquid fuel "L" is beneath the lower seat 56, the float 62 engages the lower seat 56 to form a seal, which in turn permits fuel pressure "V" to pass into the vent openings 58 and 60, through the interior passage 36 and the passage 96, and be discharged from the bore 85. The vent openings are approximately 3/16 inch to 5/16 inch in diameter to meet the 5/16 inch diameter vent requirements of marine fuel tanks.

Figure 9:
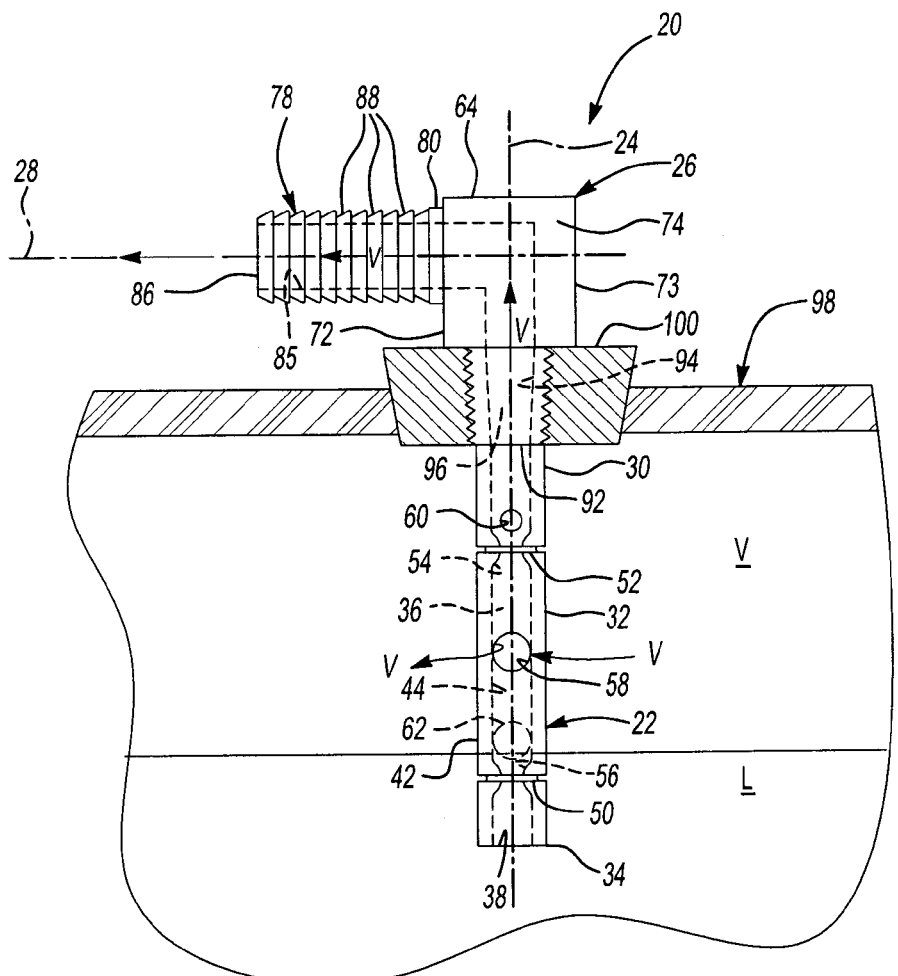
FIG. 9 is a cutaway side view of the vent assembly according to FIG. 8.
Figure 10:
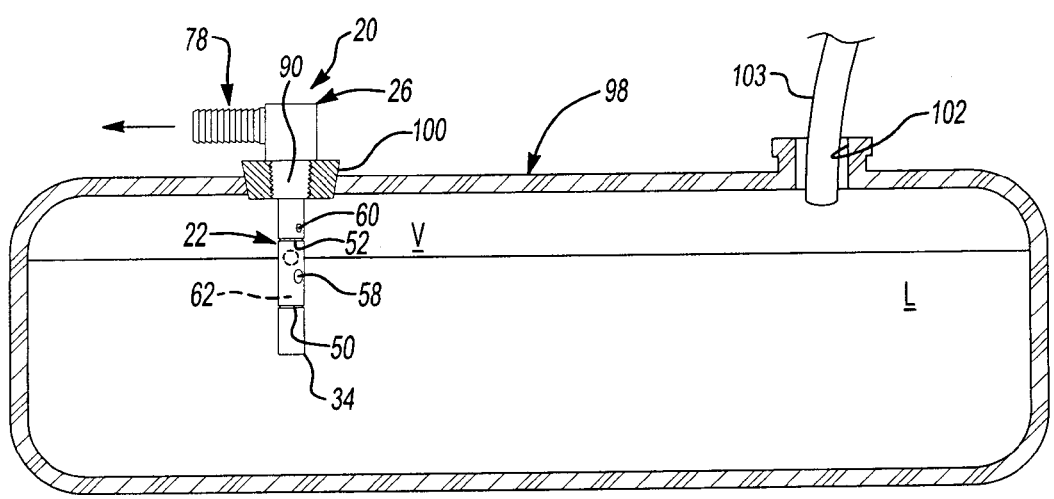
FIG. 10 is another side view of the vent assembly with the fuel tank according to FIG. 8.
Figure 11:
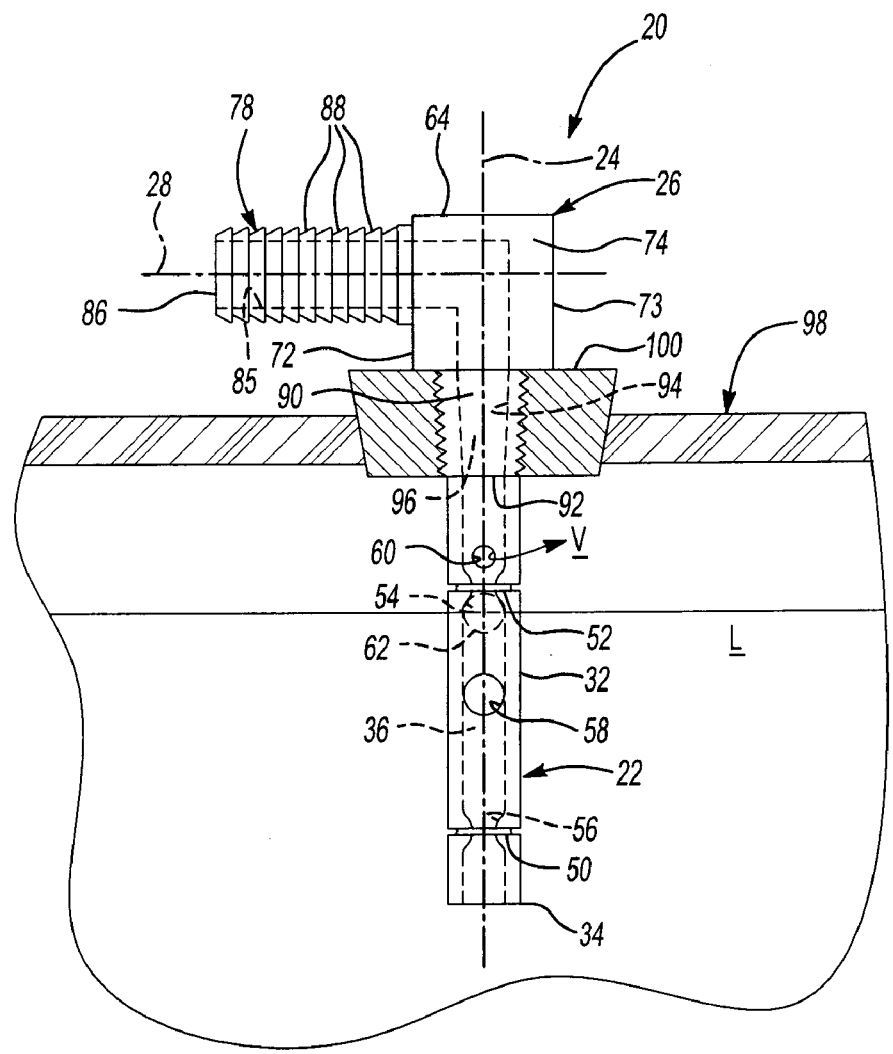
FIG. 11 is a cutaway side view of the vent assembly according to FIG. 10.

Referring now to FIG. 9, when the surface of the liquid fuel "L" in the tank 98 rises above the lower valve seat 56, the float 62 is carried, or floats, on the rising surface until the float 62 passes the openings 58. At this instant, the pressure in the tank is sufficient to shut off the nozzle and the nozzle and the nozzle will shut off. However, most marine vehicles have a long fill line from the outside of the boat to tank which can be six (6) feet or longer. Therefore, the ball 62 can float further between opening 58 and seat 52 to compensate for this additional fuel. The pressure applied by the liquid fuel "L" against the float 62 maintains the float 62 against the seat 54 to form a fluid impervious seal that prevents the liquid fuel "L" from traveling past the seat 54 and exiting the bore 85. The unobstructed second vent opening 60 allows pressure within the tank 95 above the surface of the liquid fuel "L" to be continuously vented so that pressure does not build in the tank.

The dimensions of the components the assembly 20 are customized to specifically complement the dimensions of the components of the tank 98 to ensure that the ullage space above the surface of the liquid fuel "L" in the tank 98 is maintained to occupy approximately 5 percent of the total interior volume of the tank 98, which ensures that the assembly 20 and tank 98 comply with regulations governing ullage space for permitting fuel expansion within marine fuel systems. Thus, the dimensions of the components of any given assembly 20 may vary depending upon the dimensions of the components of the tank 98 in which the assembly 20 is utilized.

Any suitable coupling systems may be used not only to couple the assembly 20 to any suitable fuel tank, but also to couple the barbed fitting 78 within the female fitting 76. Such coupling systems include, but are not limited to North American coupling systems. By way of nonlimiting example, the assembly 20 set forth herein utilizes fittings having radially extending National pipe tapered, or NPT, threads are utilized having a 3/8" nominal size with 18 threads per square inch.

It should be understood that the present invention is disclosed in a typical marine type application with reference to a plastic fuel tank. The foregoing detailed description shows that the embodiments of the present invention are well suited to fulfill the objectives of the invention. It is recognized that those skilled in the art may make various modifications or additions to the embodiments chosen herein to illustrate the present invention, without departing from the spirit of the present invention. Therefore, it is to be understood that the invention may be practiced otherwise than as specifically described.

What is claimed is:

1. A fuel tank having an exterior and interior comprising:
   an inlet for receipt of fuel;
   a vent assembly for venting pressure within said tank, said vent assembly including an upper portion having a discharge outlet for the discharge of pressure, said upper portion extending from said exterior and a lower portion extending within said interior of said fuel tank to a predetermined location within the fuel tank, said lower portion having an inlet for the receipt of liquid fuel, said inlet being positioned within said interior of said fuel tank, said upper and lower portions being operatively connected to form a flow path from said inlet through said outlet for the controlled discharge of pressure;
   said lower portion having a first and second spaced apart openings and a float mounted between said first and second openings, said first and second opening and said float being positioned within said interior of said fuel tank, said float having a first position when said first and second openings are in fluid communication allowing pressure to enter said lower tube and enter said upper portion to exit said discharge outlet and a second position wherein said float is between said first and second openings resulting in an increase in back pressure in the tank sufficient to shut off a flow nozzle, and a third position wherein said float seals said lower portion preventing liquid fuel from entering said upper portion.

2. The fuel tank of claim 1, wherein said lower portion has an elongated tube and said float is a spherical ball.

3. The fuel tank of claim 1, wherein said upper portion includes a body having a mounting connection for mounting the upper body to a fuel tank;
   and a flow channel communicating through said discharge outlet and said mounting connection.

4. The fuel tank of claim 3, wherein said mounting connection includes exterior threads for threading said mounting connection to said fuel tank.

5. The fuel tank of claim 4, wherein said flow channel within said mounting connection has a diameter sufficient to receive said lower portion.

6. The fuel tank of claim 5, wherein said lower portion is an elongated tube having an outer diameter which can be pressed fit into said channel of said mounting connection.

7. The fuel tank claim 1, wherein said lower portion includes spaced apart indentations with one of said indentations being below said first opening and the other indentation being below said second opening.

8. The fuel tank vent assembly of claim 7, wherein said spaced apart indentations are annular grooves.

9. The fuel tank vent assembly of claim 8, wherein said float is adapted to mate with said annular grooves to form a seal when said float engages said annular grooves.

\* \* \* \* \*